United States Patent [19]

Kochhar et al.

[11] 4,016,344
[45] Apr. 5, 1977

[54] OLEFIN POLYMERIZATION CATALYST

[75] Inventors: Rajindar K. Kochhar, Katy; Robert J. Rowatt, Orange, both of Tex.

[73] Assignee: Gulf Research & Development Company, Pittsburgh, Pa.

[22] Filed: Feb. 4, 1976

[21] Appl. No.: 655,197

Related U.S. Application Data

[63] Continuation of Ser. No. 159,043, July 1, 1971, abandoned.

[52] U.S. Cl. .................. 526/124; 252/429 B; 252/429 C; 252/441; 526/125; 526/351; 526/352
[51] Int. Cl.$^2$ .................. C08F 4/66; C08F 4/02; C08F 10/00
[58] Field of Search .......... 252/429 B, 429 C, 441; 526/97, 121, 124, 142

[56] References Cited

UNITED STATES PATENTS

| | | | |
|---|---|---|---|
| 3,024,227 | 3/1962 | Nowlin et al. | 526/142 |
| 3,157,627 | 11/1964 | Friedlander | 526/142 |
| 3,196,116 | 7/1965 | Klopfer et al. | 526/124 |
| 3,454,547 | 7/1969 | Delbouille et al. | 526/125 |
| 3,642,746 | 2/1972 | Kashiwa et al. | 526/125 |
| 3,647,772 | 3/1972 | Kashiwa | 526/124 |

FOREIGN PATENTS OR APPLICATIONS

| | | |
|---|---|---|
| 1,958,488 | 5/1970 | Germany |
| 1,905,583 | 9/1969 | Germany |
| 1,140,649 | 1/1969 | United Kingdom |

*Primary Examiner*—Edward J. Smith
*Attorney, Agent, or Firm*—Richard L. Kelly

[57] ABSTRACT

In mono 1-olefin polymerization processes employing a magnesium compound supported Ziegler-type catalyst; the improvement which comprises treating the magnesium compound support with an organic peroxide prior to impregnating the support with a transition metal halide catalyst component.

10 Claims, No Drawings

OLEFIN POLYMERIZATION CATALYST

This is a continuation of application Ser. No. 159,043 filed July 1, 1971, now abandoned.

BACKGROUND OF THE INVENTION

It is known that catalysts formed by combining an organometallic compound of a metal of Groups IIA, IIB and IIIA of the Periodic Table with a halide of vanadium or titanium are useful for polymerizing mono 1-olefins at low pressures and low temperatures to form resinous polyolefins. In preparing such catalysts, particularly suitable organometallic compounds are the alkyl, especially the lower alkyl compounds, of the metals of Groups IIA, IIB and IIIA, such as aluminum, zinc, cadmium and beryllium. Organometallic compounds in which the metal is attached to cycloalkyl radicals of 3 to 7 carbon atoms or aromatic radicals such as phenyl, as well as halogenated compounds such as dialkyl aluminum chlorides, are also suitable.

Some of the titanium and vanadium halides useful in preparing the aforementioned catalysts are the titanium and vanadium tetrachlorides, as well as the oxyhalides of such metals including vanadium oxychloride.

As specific examples of suitable organometallic compounds useful in forming the aforementioned catalysts can be mentioned the dialkyl cadmiums such as diethyl-cadmium, dimethylcadmium and diisobutylcadmium, the dialkylzincs such as diethylzinc and dibutylzinc, the trialkylaluminums and dialkylaluminum hydrides such as diisobutylaluminum hydride, diethylaluminum hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having 1 to 4 carbons.

These catalysts are conveniently produced by reacting the organometallic compound with the metal halide in the presence of a hydrocarbon solvent such as isooctane, n-heptane, xylene or benzene. The molar ratio between the organometallic compound and the halogenated metal can be varied within wide limits. A ratio of about 0.25 to about 4 mols of halogenated compound, such as titanium or vanadium tetrachloride, to one mol of the organometallic compound is suitable. A typical catalyst system could be composed of triisobutylaluminum and titanium tetrachloride combined in an equimolar ratio.

The above-described catalysts and processes are useful for polymerizing mono 1-olefins such as ethylene, propylene, butene-1, pentene-1, hexene-1, 4-methyl-1-pentene, vinylcyclohexane, and styrene.

Prior art processes have been described in which the transition metal halide is deposited on a carrier such as bentonite, pumice, kieselguhr, calcium, barium or strontium phosphate, zinc oxide, calcium oxide, or nickel oxide, and the base supported catalyst components mixed with the above-described co-catalysts to polymerize a mono 1-olefin. Such catalysts have only moderate productivities based on the total catalyst mixed, with the result that the catalyst components must be removed before the product polymer can be utilized. Productivities have been improved by the use of magnesium compounds such as magnesium oxide, magnesium sulfate, magnesium halides and basic magnesium carbonate as carriers for the Ziegler-type catalysts in the polymerization of ethylene, for example. These and other similar magnesium compounds when treated by conventional processes with a transition metal halide are believed to chemically react through their residual hydroxyl groups according to the following equation:

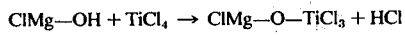

The reaction forms hydrocarbon insoluble products. A serious disadvantage of these prior art processes is that the polymerization reaction must be conducted for extremely long time periods, indicating extremely low productivity, to obtain a polymer product wherein the catalyst concentration is sufficiently low so as not to require a separate catalyst removal step.

Accordingly, an object of the invention is to provide a mono 1-olefin polymerization process employing a Ziegler-type catalyst wherein productivity of the catalyst is substantially improved.

Another object of the invention is to provide ethylene and propylene polymerization processes employing Ziegler-type catalysts wherein productivity of the catalysts is substantially improved.

Yet another object of the invention is to provide an improved mono 1-olefin polymerization process employing a Ziegler-type catalyst wherein the transition metal halide employed comprises titanium tetrachloride.

Other objects, advantages and features of the invention will be readily apparent to those skilled in the art from the following description and appended claims.

SUMMARY OF THE INVENTION

An improved Ziegler-type catalyst composition for the polymerization of mono 1-olefins is obtained by the peroxide treatment of a magnesium compound support prior to impregnating the magnesium compound support with the transition metal halide and subsequently admixing therewith an organometallic compound.

DESCRIPTION OF THE INVENTION

The novel mono 1-olefin polymerization catalysts of this invention are conveniently prepared by treating the magnesium compound catalyst support with a peroxide prior to treating the catalyst support with the transition metal halide. The magnesium compounds employed in preparation of the catalyst supports of this invention are those normally solid inorganic magnesium compounds. Preferable magnesium compounds employed in the practice of this invention are magnesium oxide, magnesium carbonate (basic), magnesium chloride, magnesium hydroxide, and magnesium oxychloride.

The magnesium compound catalyst support is treated with an organic peroxide such as lauroyl peroxide, decanoyl peroxide, caprylyl peroxide, ditertiarybutyl peroxide and benzoyl peroxide. Dicumyl peroxide, α,α-bis(t-butyl-peroxy) isopropyl benzene, and ethyl-3,3-bis(t-butyl-peroxy) butyrate are peroxides which are found to be particularly suitable in the practice of the invention. In the treatment of the magnesium compound with the peroxide, contact between the peroxide and the magnesium compound is effected in a suitable device such as a grinder or ball mill at an elevated temperature of at least 20° C. in an inert atmosphere for a period of time of normally about 10 minutes and generally not to exceed 1 hour. The concentration of the peroxide is normally maintained in the range of 0.1 to 20 grams per 100 grams of the magnesium compound support and preferably in the range of 0.5 to 10 grams per 100 grams of magnesium compound support. Contact between the peroxide and the magnesium compound can be effected by dispersing the peroxide in an inert organic solvent and contacting the magnesium compound with a solution of the peroxide.

After the peroxide treatment has been completed, the organic solvent can be separated from the magnesium compound by conventional separation methods. The treated magnesium compound powder support can then be dried at an elevated temperature in a vacuum. The peroxide-treated magnesium compound may be heated to temperatures of 50° C. or higher for pre-activation.

Following the peroxide treatment of the magnesium compound, the magnesium compound support is then contacted in an inert atmosphere with the transition metal halide selected from the titanium and vanadium halides which are liquid at room temperature. Normally, the transition metal halide is mixed with the magnesium compound support on a weight ratio basis of at least 0.05 to 1, respectively. For the most effective polymerization processes, the highest transition metal halide to magnesium compound support ratio employed will be about 10 to 1. Higher transition metal halide to magnesium compound weight ratios can be employed but such higher ratios do not appear to add any additional improvement to the process.

The Ziegler-type catalysts of this invention can be produced by reacting the previously described organometallic compound with the transition metal halide-treated magnesium compound support in the presence of an inert hydrocarbon solvent such as isooctane, n-hexane, n-heptane, xylene or benzene. Triethylaluminum, triisobutylaluminum, and diethylaluminum chloride are particularly effective in the practice of the invention. The ratio between the organometallic compound and the halogenated metal-treated magnesium compound can be varied within wide limits. A ratio of about 0.25 gram to about 30 grams of the organometallic compound, such as triethylaluminum, to 1 gram of the transition metal halide and magnesium compound admixture is suitable.

Heating the supported catalyst when combined in an inert solvent at a moderately elevated temperature improves the productivity of the catalyst. By heating is normally meant temperatures of at least about 50° C., although in some instances higher temperatures of up to about 100° C. and even higher can be employed.

Polymerization of mono 1-olefins employing the novel catalysts of this invention can be effected batchwise or by semicontinuous or continuous processes. The polymerization reaction can be conducted in the gaseous or liquid phase with the gaseous or liquid phase substantially comprising the mono 1-olefin. Under these circumstances, only minor concentrations of the inert solvent would be present in the polymerization zone, having been employed as a carrier for the catalyst components. Alternatively, the polymerization reaction can be conducted in the presence of an inert solvent such as benzene or a saturated hydrocarbon such as isooctane, n-hexane, n-heptane, xylene, pentane, or cyclohexane.

Conventional polymerization temperatures and pressures can be employed in the polymerization process. The polymerization reaction can be effected at a temperature of about 0° to 200° C., preferably at 40° to 150° C. The pressure will be at about atmospheric or above and the concentration of catalyst will range from 0.01 to about 10 percent based upon the weight of monomer present.

It is within the scope of this invention to combine the organometallic compound with the transition metal halide and magnesium compound support in an inert organic solvent prior to the introduction of the catalyst composition into the polymerization zone or, alternatively, to introduce the organometallic compound separately into the polymerization zone. It is also within the scope of this invention to employ molecular weight control agents such as hydrogen in the polymerization process.

By employing an organic peroxide-treated magnesium compound catalyst support, the productivity of the Ziegler-type catalyst is increased from 10 to 100 percent when compared with the productivities of Ziegler-type catalysts on magnesium compound supports which have not been treated with an organic peroxide. As employed herein, the productivity of the catalyst refers to the weight of polymer product obtained per weight unit of catalyst per unit of time.

The following examples are presented to illustrate the objects and advantages of the invention. It is not intended, however, to limit the invention to the specific embodiments presented therein.

EXAMPLE I

Twenty grams of magnesium oxide, 99.0 percent of which would pass through a 325 mesh screen, were mixed with stirring with 20 ml of methanol containing 0.54 grams of dicumyl peroxide in a 250 ml flask for a period of 45 minutes. Excess methanol was removed by warming the flask under vacuum and by drying the powder in a vacuum oven at 50° C. for 3 hours. The powder was then removed to a closed system, purged with dry argon and therein mixed with 50 ml titanium tetrachloride and refluxed for 1 hour. After being cooled to room temperature, excess titanium tetrachloride was removed by decantation and the slurry was washed 10 times with 200 ml portions of heptane, subsequently dried under a vacuum at 65° C. and stored in a dry box. This catalyst, hereafter identified as Catalyst A, upon analysis was found to contain 10.23 weight percent titanium and 17.59 weight percent chlorine.

A second catalyst, hereafter identifed as Catalyst B, was similarly prepared except that treatment with dicumyl peroxide was omitted. Analysis of this second catalyst indicated a titanium concentration of 5.76 weight percent and a chlorine concentration of 10.69 weight percent.

The effectiveness of the novel catalyst composition to improve polymer yield in the polymerization of ethylene was demonstrated. 0.2 gram of Catalyst A was mixed with 2 ml of a 25 weight percent solution of triisobutylaluminum and transferred to a 1500 ml Chemco polymerization reactor employing 380 ml of heptane as the carrier solvent. Additionally, 620 ml of heptane was added to the reactor and the reaction mixture was kept under a blanket of argon throughout the polymerization process. The reaction mixture was then heated to 75° C. and ethylene gas was passed to the reactor at a constant pressure of 40 psig. The polymerization reaction was initiated immediately as indicated by a sudden rise in temperature. A temperature of 75° C. was maintained throughout the polymerization reaction.

After a period of 1 hour, the polymerization reaction was terminated by cooling and venting the reactor. 195.7 grams of polyethylene with less than 1 methyl per 1000 carbon atoms was obtained after filtering and drying the reaction product. This yield corresponds to a productivity frequency of 978.5 grams per gram of catalyst per hour per liter.

EXAMPLE II

The run of Example I was repeated with the exception that Catalyst B was employed. After the polymerization reaction had been conducted for 1 hour, 143.8 grams of polyethylene with less than 1 methyl per 1000 carbon atoms was obtained, and this corresponds to a productivity of 719 grams per gram of catalyst per hour per liter.

A comparison of the results obtained in Examples I and II clearly demonstrates the effectiveness of the peroxide-treated magnesium compound support to substantially increase the productivity of the Ziegler-type catalyst.

EXAMPLE III

The run of this example demonstrates the effectiveness of employing a peroxide-treated magnesium compound support with titanium tetrachloride, triethylaluminum and hydrogen in the polymerization of ethylene. The run of this example was identical to the run of Example I with the exception that hydrogen gas was added to the reaction system at a partial pressure of 25 mmHg before the addition of ethylene. At the conclusion of 1 hour of the polymerization run, 148.7 grams of polyethylene was obtained, which translates to a productivity of 743.5 grams of polymer per gram of catalyst per hour per liter of reactor volume.

EXAMPLE IV

In this example the run of Example III was repeated with the exception that the magnesium compound support had not been treated with a peroxide. Catalyst B was employed in the polymerization reaction. At the conclusion of 1 hour of the polymerization run, 73 grams of polyethylene were obtained, which corresponds to a productivity of 365 grams per gram of catalyst per hour per liter of reactor volume.

A comparison of the runs of Examples III and IV demonstrates the effectiveness of the novel catalyst composition of the invention to substantially increase the productivity of the catalyst composition in the polymerization of ethylene.

EXAMPLE V

In this example the effectiveness of the novel catalyst in the polymerization of propylene is demonstrated. 4.0 grams of Catalyst A were passed to the reactor of Example I together with 4.0 ml of a 25 weight percent solution of triethylaluminum in heptane, and 1000 ml of heptane. The reaction mixture was heated to 67° C. and maintained at this temperature throughout the polymerization run. Propylene was continuously introduced into the reactor at a pressure of 40 psig. The polymerization reaction was terminated after 1 hour by cooling and venting the reactor. After filtering and drying, 217.5 grams of polypropylene were obtained as the product.

EXAMPLE VI

The run of Example V was repeated with the exception that Catalyst B was employed. A total of 153.0 grams of polypropylene were obtained during a polymerization reaction period of 1 hour. A comparison of the results obtained in Examples V and VI clearly demonstrates the effectiveness of the novel catalyst to substantially improve the productivity of the product obtained in the mono 1-olefin polymerization process.

EXAMPLE VII

In this example the effectiveness of the invention as it applies to the peroxide treatment of the magnesium compound support in the polymerization of propylene is demonstrated. The organic peroxide employed in this example was $\alpha,\alpha'$-bis(t-butyl-peroxy) isopropyl benzene.

Ten grams of calcined magnesite, 99.0 percent of which would pass through a 200 mesh screen, was mixed by stirring with 10 ml methanol containing 1/1000 mol of the above-named organic peroxide in a 250 ml flask for 45 minutes. Excess methanol was removed by warming the flask under vacuum and by drying the powder in a vacuum oven at 50° C. overnight. The dried powder was then treated with 25 ml of titanium tetrachloride employing the procedure described in Example I. The finally dried solid analyzed 7.37 weight percent titanium and 27.49 weight percent chlorine. 0.2 gram of a titanium tetrachloride-magnesium compound catalyst composition was mixed with 2 ml of a 25 weight percent heptane solution of triethylaluminum and the resultant admixture employed to polymerize propylene in a heptane solution.

EXAMPLE VIII

In this example the use of ethyl-3,3-bis(t-butylperoxy) butyrate as the organic peroxide in the preparation of the novel catalyst is demonstrated.

1/1000 mol of the above-named organic peroxide in 10 ml of methanol was used to treat 10 grams of the calcined magnesite of Example VII. The dried powder was then reacted with 25 ml titanium tetrachloride. 0.2 gram of a titanium tetrachloride-magnesium compound catalyst composition was mixed with 2 ml of a 25 weight percent heptane solution of triethylaluminum and the resultant admixture employed to polymerize propylene in a heptane solution.

EXAMPLE IX

In this example the use of basic magnesium carbonate as a catalyst support is demonstrated. 20 grams of magnesium carbonate (basic) powder was placed in a 300 ml fluted flask and 40 ml methanol containing 2/1000 mol of dicumyl peroxide was added. The contents of the flask were mixed on a rotary evaporator for a period of 1 hour. Alcohol was removed from the flask by heating to a temperature of 50° C. under vacuum. Final traces of the solvent were eliminated by placing the peroxide-treated magnesium carbonate overnight in a vacuum oven at 100° C.

Ten grams of the dicumyl peroxide-containing magnesium carbonate carrier were mixed in an inert atmosphere with 50 ml titanium tetrachloride and the mixture refluxed for 2 hours. The mixture was cooled and washed with decantation 5 times with 100 ml portions of hexane. The catalyst was then dried under vacuum and on analysis was found to contain 10.8 weight percent titanium and 34.4 weight percent chlorine.

0.2 gram of this titanium tetrachloride-magnesium compound catalyst was mixed with 2.0 ml of a 25 weight percent solution of triethylaluminum in heptane and the resultant mixture employed to polymerize ethylene at 75° C. and 40 psi pressure in heptane. 205 grams of a dry powder were obtained after 1 hour, giving a productivity of 1025 grams of polymer per gram of catalyst per hour.

EXAMPLE X

The run of Example IX was repeated with the exception that the magnesium carbonate (basic) was dried at 140° C. for 24 hours prior to its impregnation with dicumyl peroxide and titanium tetrachloride. The productivity of this catalyst composition was 1105 grams of polyethylene per gram of catalyst per hour.

EXAMPLE XI

This example illustrates the effectiveness of magnesium chloride as a support for the transition metal halide. Ten grams of predried and ground magnesium chloride were impregnated with 1/1000 mol of dicumyl peroxide from a methanolic solution. The dried powder was then refluxed with 50 ml titanium tetrachloride overnight in an inert atmosphere. The dark brown powder product was freed of excess titanium tetrachloride and repeatedly washed with hexane until the washings were free of chlorides. The catalyst was then dried. 0.2 gram of the resultant transition metal halide and magnesium compound support admixture was combined with 2 ml of triethylaluminum in a 25 weight percent heptane solution and the resultant catalyst composition employed to polymerize ethylene in heptane.

Although the invention has been described with reference to specific materials, embodiments and details, various modifications and changes, within the scope of the invention, will be apparent to those skilled in the art and are contemplated to be embraced in the invention.

What is claimed is:

1. A process for preparing a catalyst component which comprises contacting an inorganic magnesium compound selected from the group consisting of magnesium oxide and basic magnesium carbonate with an organic peroxide in the presence of an inert solvent and at an elevated temperature of at least 20° C., recovering the peroxide-treated inorganic magnesium compound from the inert solvent, drying the peroxide-treated inorganic magnesium compound at an elevated temperature of at least 50° C., and thereafter contacting the peroxide-treated inorganic magnesium compound with a transition metal halide selected from the group consisting of those vanadium and titanium halides normally liquid at room temperature.

2. The process of claim 1 wherein the initial contact between the organic peroxide and the inorganic magnesium compound is maintained for a period of time ranging from 10 minutes to about 1 hour.

3. The process of claim 1 wherein the concentration of the organic peroxide is maintained in the range of 0.1 to 20 grams per 100 grams of the inorganic magnesium compound.

4. The process of claim 3 wherein said organic peroxide is selected from the group consisting of dicumyl peroxide, $\alpha,\alpha'$-bis(t-butyl-peroxy) isopropyl benzene and ethyl-3,3-bis(t-butyl-peroxy) butyrate.

5. The process of claim 1 in which the transistion metal halide is titanium tetrachloride.

6. The process of claim 5 in which the titanium tetrachloride is employed in the amount of 0.05 to 10 parts per weight per part of the inorganic magnesium compound.

7. A process for preparing a polymerization catalyst which comprises contacting a catalyst component prepared by the process of claim 1 with an organometallic compound selected from the group consisting of triethyl aluminum and triisobutyl aluminum in the presence of an inert hydrocarbon solvent.

8. A process for preparing a polymerization catalyst which comprises contacting a catalyst component prepared by the process of claim 4 with an organometallic compound selected from the group consisting of triethyl aluminum and triisobutyl aluminum in the presence of an inert hydrocarbon solvent.

9. A process for preparing a polymerization catalyst which comprises contacting a catalyst component prepared by the method of claim 6 with an organometallic compound selected from the group consisting of triethyl aluminum and triisobutyl aluminum in the presence of an inert hydrocarbon solvent.

10. A process for polymerizing ethylene which consists essentially of contacting ethylene with a polymerization catalyst prepared by the method of claim 7.

* * * * *